Feb. 21, 1956    H. H. HEFFLEY    2,735,238
GLASS POLISHING MACHINE
Filed Sept. 27, 1954    2 Sheets-Sheet 1
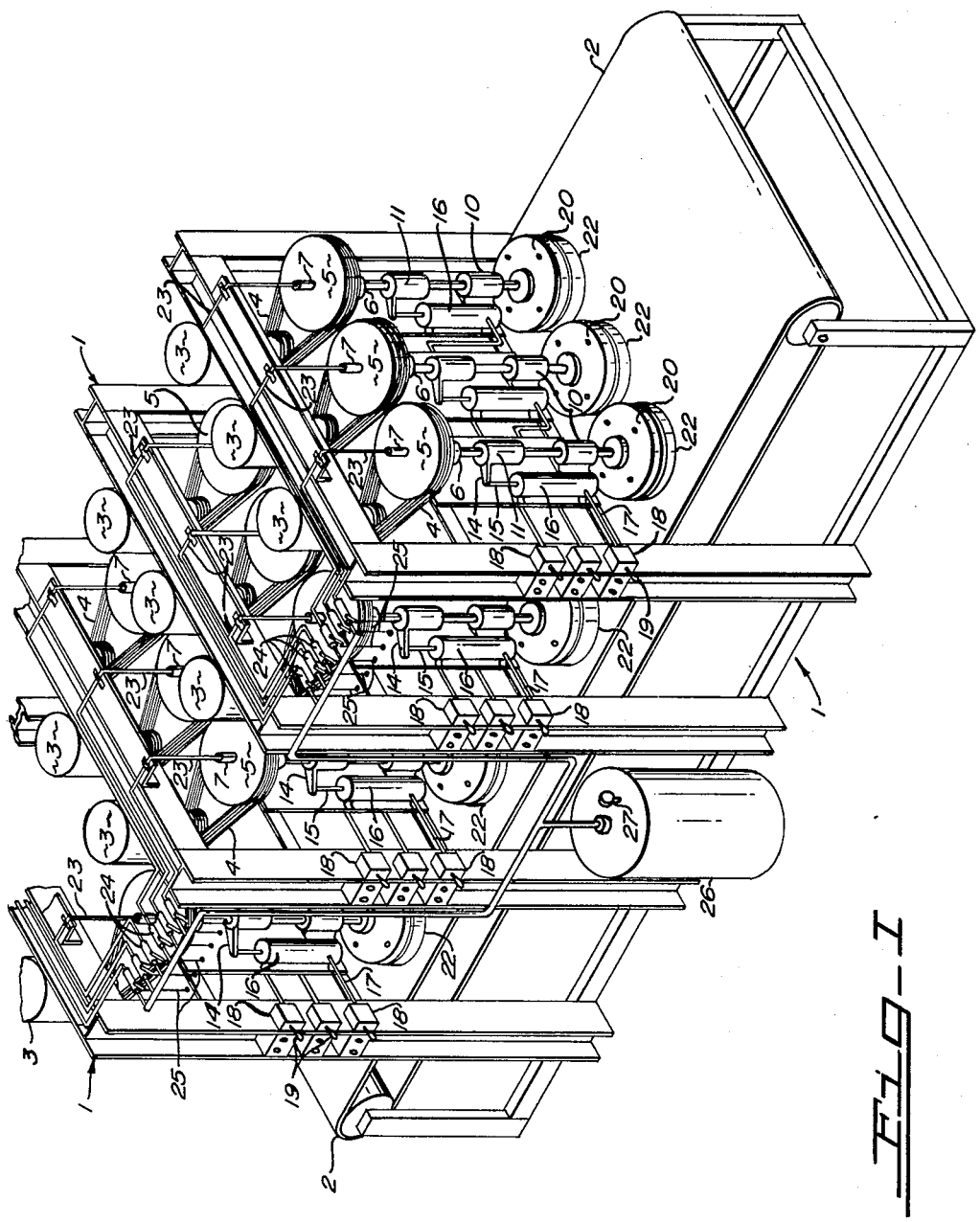
FIG-I
INVENTOR.
HOWARD H. HEFFLEY
BY
Marshall, Marshall & Heasting
ATTORNEYS

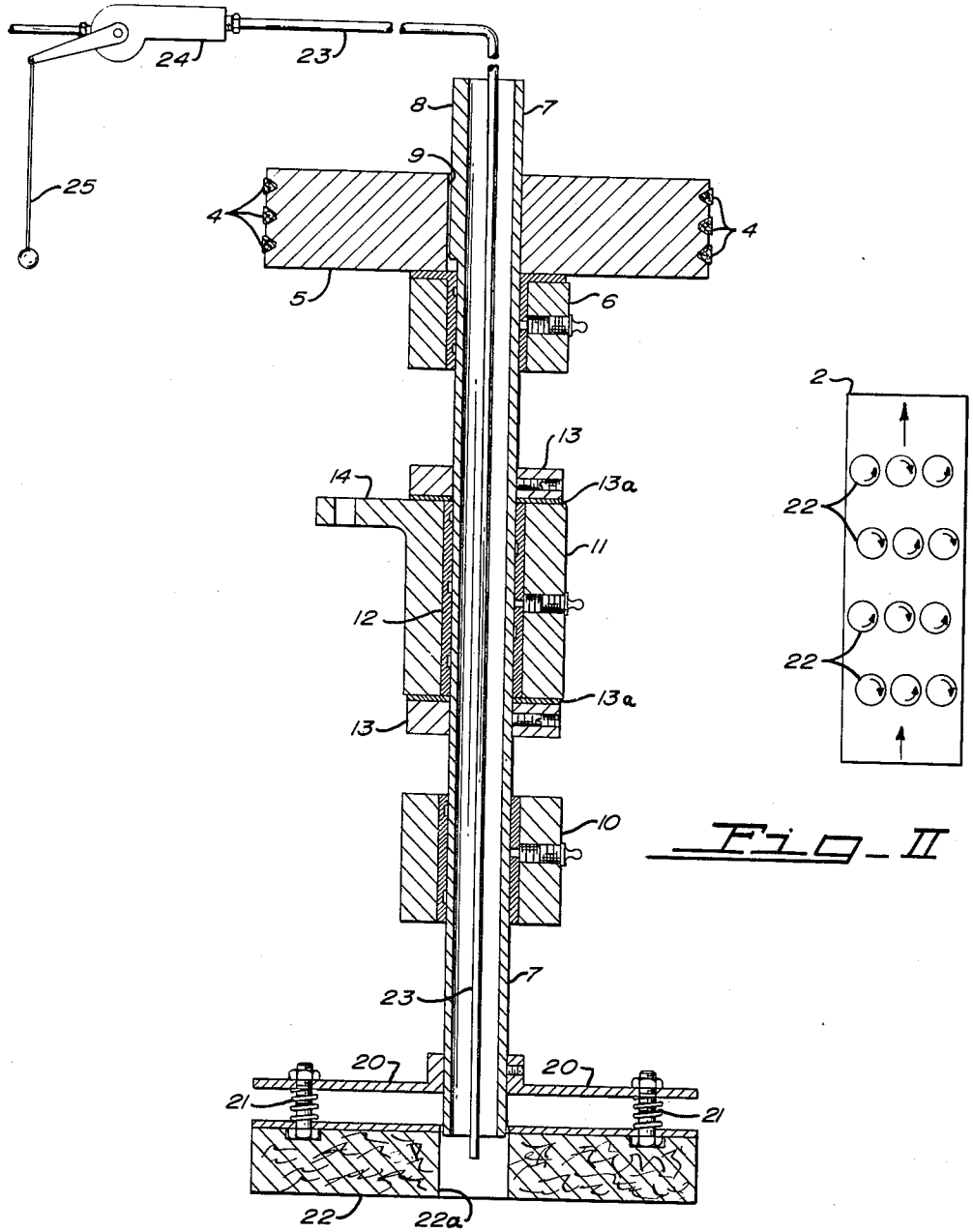

United States Patent Office 2,735,238
Patented Feb. 21, 1956

2,735,238

GLASS POLISHING MACHINE

Howard H. Heffley, Toledo, Ohio, assignor to The Toledo Plate and Window Glass Company, Toledo, Ohio, a corporation of Ohio Application September 27, 1954, Serial No. 458,430

4 Claims. (Cl. 51—110)

This invention relates to apparatus for polishing glass.

Flat glass as it comes from the manufacturer nearly always has small scratches and other surface defects which are not usually objectionable when the glass is used for windows. When the glass is used for mirrors, however, such fine scratches and slight blemishes become noticeable. Manufacturers of high grade mirrors therefore repolish the glass before it is silvered.

The manufacturer of flat glass surfaces the glass by means of heavy polishing equipment which cannot be used satisfactorily by the manufacturer of high grade mirrors to repolish the glass. Such equipment is not provided with means for feeding controlled small amounts of grinding compound and does not keep the grinding compound in suspension at all times. Furthermore, it is necessary when using such equipment to hold the glass on a conveyor by means of plaster, suction, or clamps. Such methods are not practical in repolishing glass before it is silvered.

Machines heretofore used for repolishing glass had felt disks attached to vertical spindles which rotated the disks to spread the polishing compound uniformly over the surface being polished. In such machines the polishing compound consisting of a suspension of black or red rouge in water or some equivalent polishing material was sprinkled upon the glass exteriorly of the polishing disks, the glass being moved back and forth on reciprocating tables. The disks were made rather small, i. e., five or six inches in diameter, so that their centrifugal action would not keep the polishing compound away from the centers of the disks. If the centers of the disks got dry they were liable to "burn" the glass surface being polished or even to seize against the glass surface and whirl the glass around with the disk.

The efficiency of the prior art machines for repolishing glass was very low because of the use of the reciprocating tables for moving the glass back and forth underneath the polishing disks. Such tables must be constantly adjusted to position the unpolished areas of glass beneath the polishing disks. For example, if a 36 inches by 48 inches piece of flat glass is polished on a conventional machine and 8 inch diameter polishing disks are used, it is necessary for the operator to reposition the carrying table approximately five times to polish the entire area of the glass surface.

The principal object of this invention is to provide a glass polishing machine which will efficiently polish various widths of flat glass during a continuous operation.

Another object of the invention is to provide, in a glass polishing machine, means for feeding polishing material in suspension to the center of a polishing disk in such a manner that the polishing compound is kept in suspension at all times, whereby the centrifugal action of the rotating disk spreads the suspension uniformly over the surface being polished.

A further object of the invention is to provide in a glass polishing machine, means for closely controlling the amount of polishing compound fed to the center of a polishing disk.

Another object of the invention is to provide a glass polishing machine having a conveyor for continuously carrying glass in one direction underneath polishing disks, whereby a very efficient polishing process may be carried on.

Still another object of the invention is to provide, in a glass polishing machine, means for moving glass underneath a polishing disk which means holds the glass by only the friction between the glass and the means for moving.

Another object of the invention is to provide a glass polishing machine having a plurality of polishing assemblies so arranged that glass moving underneath the assemblies emerges with its entire surface polished uniformly.

Still another object of the invention is to provide, in a glass polishing machine having a plurality of polishing assemblies, means for individually shifting each of the assemblies into and out of operative position.

A further object of the invention is to provide a glass polishing machine so constructed that it is easy to operate and safe for operators to be near.

More specific objects and advantages are apparent from the following description of a specific embodiment of the invention.

According to the invention, a glass polishing machine is provided with a conveyor and at least one polishing assembly. It is only necessary for an operator to place glass on the conveyor which then automatically carries the glass underneath the polishing assembly. The assembly includes a hollow shaft and an apertured polishing disk attached to an end of the shaft. A suspension of polishing material is pressure fed through the aperture in the polishing disk in a manner such that the polishing material stays in suspension at all times and in a manner permitting a closely controlled amount to be fed. The centrifugal action of the rotating disk spreads the suspension uniformly over the surface being polished. The friction between the polishing disk and the glass being polished is always less than the friction between the conveyor and the glass. Thus, the glass can be held upon the conveyor by friction only and no plaster, suction, or clamps need be used. The close control of the amount of polishing compound is extremely important to keep enough polishing compound on the glass at all times so that the polishing disk cannot "burn" the glass surface or seize against the glass surface and whirl the glass around with the disk, and at the same time to prevent too much polishing compound from causing a reduction in the maximum available polishing action.

The invention may be more readily understood from the following detailed description of a specific embodiment in which description reference is made to the accompanying drawings:

In the drawings:

Figure I is a perspective view of the machine for polishing glass.

Figure II is a schematic plan view of the machine illustrated in Figure I, showing the arrangement and the direction of rotation of the polishing disks.

Figure III is a sectional view of one of the polishing assemblies illustrated in Figure I.

These specific drawings and the accompanying description are intended merely to illustrate the invention but not to limit its scope.

The glass polishing machine includes a frame 1 supporting a conveyor 2 in the form of a wide belt upon which glass to be polished is laid. The frame also supports motors 3 which are connected by means of V-belts 4 to pulleys 5 that are rotatably mounted on the flanges of flanged bearings 6 supported on the frame 1. Extending through the centers of the pulleys 5 and through the flanged bearings 6 are hollow shafts 7 which have keys 8 fitting into keyways 9 in the pulleys so that the hollow shafts turn with the pulleys, but may be slid up and down through the pulleys and through the flanged bearings 6.

The hollow shafts 7 are journaled near their lower ends in shaft bearings 10 supported on the frame 1 within which bearings they may turn freely and may also be slid up and down similarly to the manner in which the shafts 7 turn and may be slid up and down within the flanged bearings 6. Located on the hollow shafts 7 between the flanged bearings 6 and the shaft bearings 10 are sleeves 11 having bushings 12 within which the hollow shafts 7 turn but to which sleeves the hollow shafts are so connected by means of collars 13 fixed to the shafts that when the sleeves 11 are raised they lift the shafts 7 with them. The collars 13 rotate with the turning shafts 7 and are separated from the sleeves 11 by means of friction washers 13a. When the sleeves 11 are raised or lowered, the shafts 7 are also raised or lowered and at the same time continue to rotate. Each of the sleeves 11 is connected by means of an arm 14 to a plunger rod 15 which extends into an air cylinder 16. Air may be admitted to the lower end of the cylinder 16 through a tube 17 by manipulating a valve 18. The valve is so constructed that when a handle 19 is raised air will be admitted to the lower end of the cylinder 16 pushing up the plunger rod 15 and thus elevating the hollow shaft 7 and when the handle 19 is lowered the air is permitted to escape from the lower part of the cylinder so that the hollow shaft 7 and the parts carried thereby descend by their own weight into operative contact with glass on the conveyor 2.

Fixed to the lower ends of the hollow shafts 7 are plates 20 and resiliently attached to the plates 20 by means of springs 21 are thick, flat, felt polishing blocks or disks 22. The polishing disks 22 each has a centrally located aperture 22a which registers with the hollow of the shafts 7.

Each polishing assembly comprising one of the hollow shafts 7 and one of the attached apertured polishing disks 22 is identically the same. The sectional view (Figure III), therefore, is illustrative of any one of the polishing assemblies shown in Figure I. Each polishing assembly is provided with its own motor 3 and each is provided with its own means for being individually shifted into and out of operative contact with the glass on the conveyor.

The polishing assemblies are mounted on the frame in four groups of three assemblies each. The assemblies in each group are located in a line substantially transverse to the path of movement of the glass. As shown in Figure II, the polishing assemblies are not located in straight lines longitudinally of the conveyor 2 but are staggered, the second group of polishing assemblies being offset laterally with respect to the first group so that the glass surface which passes by the polishing disks of the first group will pass under disks of the second group. Disks of the third group and of the fourth group likewise are offset laterally so that when the glass emerges from beneath the fourth group of disks its entire surface has been polished uniformly. As also shown in Figure II, each polishing disk is rotated in an opposite direction from the direction in which the disk adjacent to it is rotated. This procedure is used as a safeguard to help keep the glass on the conveyor 2 if the friction between a polishing disk and the surface of the glass should become greater than the friction between the conveyor and the glass. That is, the force tending to whirl the glass produced by one rotating disk will tend to be canceled out by the oppositely directed force produced by its neighboring disk. This is important because the glass polishing machine is a universal machine capable of processing various widths of glass. If narrow pieces of glass are to be processed, several of the longitudinal extending rows of polishing assemblies may be shifted out of operative contact with the glass so that only the polishing assemblies needed to cover the width of the glass being polished are operated.

Leading into the upper end of each of the hollow shafts 7 is a tube 23 having a normally closed shut off valve 24 controlled by a pull cord 25. The tubes 23 are rigidly mounted on the frame 1 exteriorly of the hollow shafts 7 and extend through the shafts to the apertures 22a in the polishing disks 22 for directing polishing compound onto the glass. The polishing compounds used in the repolishing of glass are suspensions of polishing materials in water, such as black or red rouge and cerium oxide suspended in water. The repolishing of glass requires only a small amount of polishing compound. In order to feed a small and closely controlled amount of the polishing compound and in order to keep the polishing material in suspension at all times, the polishing compound is supplied under pressure to the tubes 23 from a pressure vessel 26 having a pressure gage 27. Preferably, the gage pressure should be between twenty and fifty pounds per square inch, however, any pressure may be used as long as the polishing material stays in suspension at all times and there is enough pressure to feed closely controlled small amounts of polishing compound.

Close control of the amount of polishing compound is extremely important to keep enough polishing compound on the glass at all times so that the polishing disks 22 cannot "burn" the glass surface or seize against the glass surface and whirl and glass around with the disks and at the same time to prevent too much polishing compound from causing a reduction in the maximum available polishing action. The close control is maintained by the shut off valves 24 which when opened by the operator pulling the cords 25 permit a spurt of polishing compound under pressure to enter the tubes 23 and when released by the operator instantly cut off the flow of polishing compound. When a shut off valve 24 is opened, its connected tube 23 directs the polishing compound under pressure through the aperture 22a in its associated polishing disk 22 onto the glass. Thus, when the polishing disks 22 are being rotated upon the surface of the glass which is being carried under the disks by the conveyor 2, the polishing compound is supplied at the centers of the disks and spread by centrifugal action.

The polishing compound reduces friction between the polishing disks 22 and the surface of the glass in such a degree that the friction between the glass and the conveyor 2 is sufficient to carry the glass under the disks with no liability that the glass may turn or otherwise shift on the conveyor. In the polishing of glass, it has been the general procedure under conveyorized operations to hold the glass by means of plaster, suction, or clamps. Such methods are not practical in the repolishing of glass for mirrors.

The supplying of the polishing compound at the centers of the polishing disks 22 enables the disks to be made larger and thereby a greater peripheral speed is permissible as compared to the peripheral speed of the polishing disks of machines heretofore used for repolishing glass. Heretofore, the polishing compound was sprinkled on the glass exteriorly of the polishing disks. The disks were made small so that their centrifugal action would not keep the polishing compound away from the centers of the disks. If the centers of the disks got dry, they were liable to "burn" the glass surface being polished or even to seize against the glass surface and whirl the glass around with the disks. In the present machine for polishing glass, such disasters are provided against by feeding the polishing compound down through the hollow shafts 7. Furthermore, the present machine is provided with means for feeding the polishing compound under pressure to keep the polishing compound in suspension at all times and to enable a close control to be maintained on the amount of polishing compound being fed. The operator of the machine by pulling the cords 25 can direct just enough polishing compound onto the glass to keep the rotating disks 22 from moving the glass and at the same time not too much so that any of the possible polishing action is lost.

In operation, the operator shifts all twelve of the rotating polishing disks 22 into inoperative position by manipulation of the handles 19. He then starts the conveyor 2 moving pieces of glass underneath the polishing disks. As the leading edge of the first piece of glass reaches the first group of rotating disks, the operator causes the polishing disks 22 in the first group to be lowered by gravity into operative contact with the surface of the glass and causes spurts of polishing compound to be directed onto the glass by pulling the proper pull cords 25. This procedure is repeated as the leading edge of the first piece of glass reaches the other groups of rotating disks. Once the polishing disks have been lowered, pieces of glass are continuously fed into the machine and are fed automatically underneath the disks without further shifting of the disks into or out of operative position. The operator, through experience, knows how much polishing compound must be fed to attain the best results. Occasionally he may cause a polishing disk to be individually lifted to visually inspect the amount of polishing compound underneath the disk and occasionally he pulls the pull cords 25 to maintain the proper amount of polishing compound between the polishing disks and the glass. Wide pieces of glass may be processed by using all of the polishing assemblies or narrower pieces of glass may be processed by lifting one or two of the longitudinally extending rows of polishing assemblies into inoperative position.

Various modifications may be made in specific details of construction without departing from the spirit and scope of the invention.

Having described the invention, I claim:

1. A glass polishing machine, comprising, in combination, a frame, a substantially horizontal conveyor belt supported by the frame for moving pieces of flat glass of various widths through the machine, a plurality of polishing assemblies rotatably mounted on the frame, each assembly including a vertical shaft, a belt driven pulley through which the shaft extends, the shaft constantly rotating with the pulley but being vertically slidable therethrough, an apertured polishing disk attached to an end of the shaft, a vertically shiftable bearing in which the shaft rotates but in which the shaft is not slidable and a manually controlled lifter for said bearing operable at will by an attendant for raising the disk vertically sufficiently to permit visual inspection of the glass being polished, all of said disks being above and substantially parallel to said conveyor belt, and manually controlled means for feeding polishing compound under pressure through the apertured disks onto the glass.

2. A glass polishing machine according to claim 1 wherein said shafts are hollow and said manually controlled means for feeding feeds said polishing compound through said hollow shafts to the apertured disks and onto the glass.

3. A glass polishing machine according to claim 1 wherein the plurality of polishing assemblies are staggered longitudinally of the conveyor belt.

4. A glass polishing machine according to claim 1 wherein the polishing assemblies are arranged in a plurality of groups, each group including a plurality of polishing assemblies located in a line substantially transverse to the path of movement of said conveyor belt and each group being offset laterally with respect to its adjacent group.

References Cited in the file of this patent
UNITED STATES PATENTS

| | | |
|---|---|---|
| 1,583,807 | Soderberg | May 11, 1926 |
| 1,698,970 | Shaff | Jan. 15, 1929 |
| 1,803,752 | Ford | May 5, 1931 |
| 2,083,773 | Burroughs | June 15, 1937 |
| 2,285,318 | Waldron | June 2, 1942 |
| 2,309,819 | Benner | Feb. 2, 1943 |
| 2,332,992 | Davis | Oct. 26, 1943 |
| 2,646,655 | Laverdisse | July 28, 1953 |
| 2,673,423 | Hoyet et al. | Mar. 30, 1954 |
| 2,673,428 | Cook | Mar. 30, 1954 |
| 2,699,021 | Laverdisse | Jan. 11, 1955 |